United States Patent [19]

Mori et al.

[11] 4,260,731
[45] Apr. 7, 1981

[54] AROMATIC POLYESTER-POLYCARBONATE

[75] Inventors: Hajime Mori; Katsuhisa Kohyama; Katsuhiko Nakamura, all of Kitakyushu; Katsuyuki Sakata, Nakama, all of Japan

[73] Assignee: Mitsubishi Chemical Industries, Ltd., Tokyo, Japan

[21] Appl. No.: 68,067

[22] Filed: Aug. 20, 1979

[30] Foreign Application Priority Data

Sep. 11, 1978 [JP] Japan .................. 53/111518
Sep. 22, 1978 [JP] Japan .................. 53/117232

[51] Int. Cl.³ .............................. C08G 63/64
[52] U.S. Cl. ........................ 528/173; 528/194
[58] Field of Search ..................... 528/173, 194

[56] References Cited

U.S. PATENT DOCUMENTS

| 3,133,898 | 5/1964 | Keck | 528/194 |
| 3,169,121 | 2/1965 | Goldberg | 528/194 |
| 3,395,119 | 7/1968 | Blaschke et al. | 528/194 |

Primary Examiner—Lester L. Lee
Attorney, Agent, or Firm—Oblon, Fisher, Spivak, McClelland & Maier

[57] ABSTRACT

An aromatic polyester-polycarbonate resin which comprises a polymer material composed of repeating units of structures I–III:

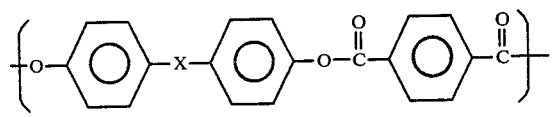

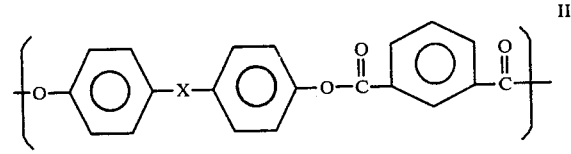

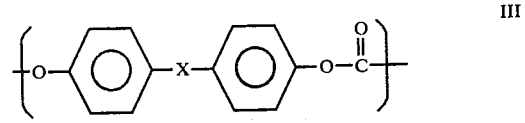

wherein X is a divalent organic radical and the divalent aromatic entities in structures I, II and III may be substituted by hydrocarbon residues.

8 Claims, No Drawings

AROMATIC POLYESTER-POLYCARBONATE

BACKGROUND OF THE INVENTION

1. Field of the Invention

The present invention relates to aromatic polyester-polycarbonate resins. More particularly, the present invention relates to aromatic polyester-polycarbonate resins which have excellent mechanical properties, thermal stability, chemical resistance and transparency and which are suitable for the fabrication of articles by melt molding.

2. Description of the Prior Art

In the preparation of prior art aromatic polyester-polycarbonates, one resin which has been suggested is a copolymer which is produced by the reaction of 2,2-bis-(4-hydroxyphenyl)-propane-(bis-phenol A) with terephthaloyl chloride and phosgene. The copolymer has a bis-phenol A residue:terephthalic acid residue:carbonate moiety constituent mole ratio in the range of 2:0.8–1.3:1.2–0.7 and a glass transition point (Tg) in the range of from 170° to 194° C. (Japanese Patent Laid-Open Publication No. 128992/1977). Because of its high softening point and high melt viscosity, however, the polyester-polycarbonate product has not proved to have satisfactory moldability characteristics. When it is to be injection molded into a shaped article, for example, it must be molded at high temperature, metal-die temperature and injection pressure. The use of high temperatures has the disadvantage that thermal deterioration of the resin occurs. Moreover, the use of high injection pressure is disadvantageous because it distorts the shaped product. Still further, the use of elevated temperature and pressure increases the cost of preparation. Under these circumstances, a need has long been felt for polyester-polycarbonates of improved moldability.

SUMMARY OF THE INVENTION

Accordingly, one object of the present invention is to provide a polyester-polycarbonate resin of improved moldability characteristics.

Another object of the present invention is to provide a polyester-polycarbonate resin having a low melting point and low melt viscosity.

Briefly, these objects and other objects of the present invention as hereinafter will become more readily apparent can be attained by an aromatic polyester-polycarbonate resin composed by repeating units of structures I-III as follows:

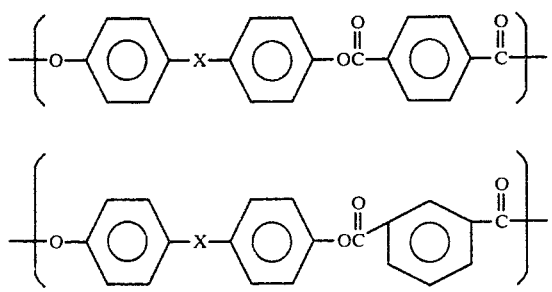

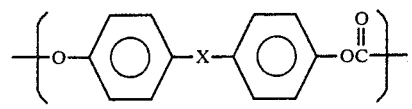

wherein X is a divalent organic radical and the divalent aromatic entities in structures I, II and III maybe substituted by hydrocarbon residues. The resin product of the invention has an intrinsic viscosity at 20° C. of 0.4 to 1.5 and a glass transition point ranging from 160° to 190° C.

DETAILED DESCRIPTION OF THE PREFERRED EMBODIMENTS

In the search for an aromatic polyester-polycarbonate of improved moldability, it has been found that an aromatic polyester-polycarbonate produced by reacting a combination of a terephthaloyl chloride compound and a specific proportion of an isophthaloyl chloride compound with bis-phenol A and phosgene possesses a low melting point and low melt viscosity and exhibits substantially improved moldability in comparison to an aromatic polyester-polycarbonate produced by reacting a single terephthaloyl chloride with bis-phenol A and phosgene. Moreover, the mixed isophthaloyl and terephthaloyl containing product alone has substantially the same mechanical, thermal stability, chemical resistance, transparency, and the like, properties as the known polyester-polycarbonate resins.

The aromatic polyester-polycarbonate of the present invention can be produced by interfacial polymerization or solution polymerization, using as the starting materials, a dihydroxydiaryl compound of the formula:

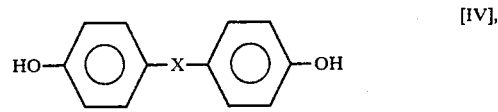

wherein X is a divalent group such as $>CRR$, $>C=R'$, $-O-$, $-S-$, $-SO-$ or $-SO_2-$, and R is either a hydrogen atom or a monovalent hydrocarbon group and R' is a divalent hydrocarbon group, a mixture of a terephthaloyl chloride and an isophthaloyl chloride and phosgene.

Examples of suitable dihydroxy-diaryl compounds include bis-(hydroxy-aryl)-alkanes such as bis-(4-hydroxyphenyl)-methane, 1,1-bis-(4-hydoxyphenyl)-ethane, 2,2-bis-(4-hydroxyphenyl)-propane, 2,2-bis-(4-hydroxyphenyl)-butane, 2,2-bis-(4-hydroxyphenyl)-octane, bis(4-hydroxyphenyl)-phenyl-methane, 2,2-bis-(4-hydroxy-3-methylphenyl)-propane, 1,1-bis-(4-hydroxy-3-tert.butylphenyl)-propane; bis-(hydroxyaryl)-cyclo-alkanes such as 1,1-bis-(4-hydroxyphenyl)-cyclo-pentane and 1,1-bis-(4-hydroxy-phenyl)-cyclo-hexane; dihydroxyl-diaryl ethers such as 4,4'-dihydroxy-diphenyl ether and 4,4'-dihydroxy-3,3'-dimethyl-diphenyl ether; dihydroxy-diaryl sulfides such as 4,4'-dihydroxy-diphenyl sulfide and 4,4'-dihydroxyl-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethylphenyl sulfone.

Examples of suitable terephthaloyl chloride compounds in addition to terephthaloyl chloride itself within the scope of the invention include those which contain a monovalent hydrocarbon substituent on the ring such as methyl terephthaloyl chloride, and 2,5-dimethyl terephthaloyl chloride.

Examples of suitable isophthaloyl chloride compounds in addition to isophthaloyl chloride itself within the scope of the invention include those which contain a monovalent hydrocarbon substituent on the ring such as 2-methyl isophthaloyl chloride.

In the technique of the present invention, mixtures of a terephthaloyl chloride compound and an isophthaloyl chloride compound are used in varying amounts. Hereinafter, such mixtures are referred to briefly as a "mixed phthaloyl chloride."

The aromatic polyester-polycarbonate product of the present invention contains, as benzene dicarboxylic acid residues, both a terephthalic acid residue and an isophthalic acid residue. The mole ratio of terephthalic acid residue to isophthalic acid residue is desirably within the range of 9:1 to 2:8, preferably 8:2 to 3:7. The value of the mole ratio of the terephthalic acid residue to the isophthalic acid residue is determined by hydrolyzing the resin in boiling alkali methanol and subjecting the hydrolyzate to analysis by high-speed liquid chromatography.

In the preparation of the present product, when the proportion of the isophthalic acid residue in the aromatic polyester-polycarbonate product is less than the indicated mole ratio, the moldability of the aromatic polyester-polycarbonate is not improved sufficiently. When the value of the ratio is greater than the specified upper limit, the mechanical properties such as tensile strength, bending strength, impact strength, creep resistance and physical properties such as solvent resistance, boiling water resistance and the like of the aromatic polyester-polycarbonate are less than normally required. Thus, the mixing ratio of the two phthaloyl chloride compounds is selected with suitable consideration given to the balance which is desired to be maintained between the moldability (fluidity) and the mechanical and physical properties of the polyester-polycarbonate product synthesized.

The amounts of dihydroxy-diaryl compound, mixed phthaloyl chloride and phosgene employed in the reaction are those which provide a product having a dihydroxy-diaryl compound residue:benzene-dicarboxylic acid residue:carbonate moiety mole ratio within the range of 1:0.33–0.75:0.67–0.25, preferably 1:0.33–0.49:0.67–0.51. When the proportion of the benzene-dicarboxylic acid residue in the product is less than the indicated mole ratio amount, no sufficient improvement is obtained in the glass transition point of the product. When the proportion of the carbonate moiety in the product is less than the indicated mole ratio amount, the properties inherently possessed by the polycarbonate product are inferior. It should be noted that the mole ratio of the various constituents of the composition can be determined on the basis of the ratio of peaks, i.e., 1,740 cm$^{-1}$ for the —COO— group and 1,770 cm$^{-1}$ for the —OCOO— group, found in the infrared spectrum of the product.

In the case of the aromatic polyester-polycarbonate of the present invention, the intrinsic viscosity $[\eta]$ which can be determined from the formula:

$$\eta sp/C = [\eta] + 0.427\ [\eta]^2 C,$$ should fall within the range of from 0.4 to 1.5, preferably from 0.45 to 1.1. The intrinsic viscosity is determined by placing the polyester-polycarbonate product in methylene chloride at a concentration of 0.6 g/dl and obtaining a measurement at 20° C. If the value of $[\eta]$ is too large, the moldability of the product is inferior. Conversely if the value is too small, the mechanical properties of the product are not sufficient.

The glass transition point (Tg) of the aromatic polyester-polycarbonate of the present invention is determined by scanning differential thermal analysis and it should be within the range of from 160° to 190° C., preferably from 170° to 185° C. Further, the aromatic polyester-polycarbonate product should have a terminal carboxyl group content of not more than 10$\mu$ equivalent/g of resin.

The aromatic polyester-polycarbonate of the present invention can be manufactured by various methods. For example, in the solution polymerization method the resin can be formed by reacting a dihydroxy-diaryl compound with a mixed phthaloyl chloride in an organic solvent using pyridine or some other similar compound as an acid acceptor to produce a low molecular polyester oligomer having terminal OH groups. Thereafter, the oligomer is reacted with phosgene to induce polycondensation. In the interfacial polymerization method the resin product can be formed by first mixing, for esterification, an aqueous alkaline solution of the above dihydroxy-diaryl compound with a solution of the mixed phthaloyl chloride in an organic solvent to produce a low molecular polyester oligomer having terminal —OH groups. Thereafter, the oligomer is reacted with phosgene to convert the terminal —OH groups into —OCOCl groups and then the oligomer in an organic solvent is reacted with a dihydroxy-diaryl compound in an aqueous alkaline solution.

As described above, the aromatic polyester-polycarbonate of the present invention possesses a high glass transition point and a low terminal carboxyl group content of less than 10$\mu$ equivalent/g of resin, and excels in a number of characteristics which include mechanical properties, thermal stability, chemical resistance and transparency. Moreover, the product exhibits notably improved moldability and low melt viscosity. For these reasons, the product of the present invention is very useful from a commercial point of view.

Having generally described the invention, a more complete understanding can be obtained by reference to certain specific examples, which are included for purposes of illustration only and are not intended to be limiting unless otherwise specified.

The values of $[\eta]$, Tg, the mole ratio of the constituents of the resin composition and the mole ratio of terephthaloyl chloride to isophthaloyl chloride which are indicated in the following working examples are those determined by the methods described above. For purposes of brevity, terephthaloyl chloride and isophthaloyl chloride are respectively expressed as TPC and IPC.

EXAMPLE 1

A solution of 2.5 kg of TPC and 2.5 kg of IPC dissolved in 95 kg of methylene chloride, an aqueous alkaline solution of bis-phenol A containing 6 kg of bisphenol A and 6 g of triethylamine dissolved in 40 liters of a 5% (weight) sodium hydroxide solution were prepared.

Into a stainless steel tube with a 4 mm inside diameter and 20 m in length, were fed the methylene chloride solution containing TPC and IPC and the aqueous alkaline solution of bisphenol A at respective flow rates of 24.4 kg/hr and 16.1 kg/hr. The stainless steel tube was wound in the shape of a coil and was cooled in a water tank. Into this tube, was fed phosgene at a flow rate of 0.6 kg/hr through a tube having an inside diameter of 3 mm and attached to the reactor tube at a distance of 8 m from the inlet of the stainless steel tube. When the reaction solution flowing from the outlet of the tube was placed in the receptacle, it immediately separated into two phases. After the reaction continued for about one hour, about 1 liter of the reaction solution was collected. This solution immediately separated into two phases. While a 250-ml portion of the methylene chloride phase containing the oligomer and 0.25 of p-tert-butyl phenol were vigorously stirred in a 1-liter flask, a solution obtained by dissolving 40 g of bis-phenol A in 500 g of an aqueous 3% sodium hydroxide solution and 0.05 g of the triethylamine were added thereto and the mixture was allowed to undergo polycondensation for one hour. The reaction temperature was in the range of from 26° to 30° C. The resultant reaction solution was left to stand, and upon standing, separated into two phases. Then, the methylene chloride phase containing the polymer was washed with water, washed with an acid and then washed again with water in the order mentioned. Then the washed phase was freed from methylene chloride by evaporation and dried to afford a white solid resin.

This resin was found to have an intrinsic viscosity $[\eta]$ of 0.76 and a glass transition point (Tg) of 180° C. The constituents of the product were present in a mole ratio of bis-phenol A residue to sum of terephthalic acid residue and isophthalic acid residue (benzene dicarboxylic acid residue) to carbonate moiety of 1:0.58:0.42. The terephthalic acid residue:isophthalic acid residue mole ratio in the product was 5:5. The resin's terminal carboxylic acid group content was $0.3\mu$ equivalent/g of resin.

EXAMPLE 2

A 5% (by weight) solution prepared by dissolving an equivalent-weight mixture of TPC and IPC in methylene chloride and an aqueous alkaline solution of bis-phenol A prepared by dissolving 15 parts (by weight) of bis-phenol A and 0.05 part of triethylamine in 100 parts of an aqueous 5% sodium hydroxide solution were fed to the same reaction tube as used in Example 1 at feed rates of 33.5 kg/hr and 21.6 kg/hr, respectively. Phosgene was fed into the reaction tube through the inlet disposed along the middle of the length of the tube at a feed rate of 1.08 kg/hr.

The reaction solution flowing from the outlet of the tube was introduced into a 10-liter settler and it continuously separated into a water phase and a methylene chloride phase.

The separated methylene chloride phase was fed to a 50-liter buffled agitator (first polymerization column) provided with an overflow type discharge pipe and, at the same time, a solution prepared by dissolving 35 parts of bis-phenol A in 600 parts of an aqueous 2.5% sodium hydroxide solution and a solution of 6% p-tertiary butyl phenol in methylene chloride were fed thereto at feed rates of 60 kg/hr and 0.5 kg/hr respectively to induce polycondensation. The reaction solution which flowed from the overflow tube was introduced into a second polymerization column having the same specifications as the first polymerization column, for completion of the polycondensation reaction.

The reaction solution flowing from the overflow tube of the second polymerization column was transferred into a 10-liter settler, where the solution separated into a water phase and a methylene chloride phase. In the combination of a 15-liter agitation tank provided with an overflow type discharge tube and a 10-liter settler, the methylene chloride phase was washed with water, washed with hydrochloric acid and washed again with water. The weight of the washing liquid used in each washing was two times that of the methylene chloride solution.

The methylene chloride phase which had undergone the last round of washing was fed into a kneader heated to 130° C. by means of a steam jacket, wherein the solution was freed from methylene chloride by evaporation and flakes of a resin material were obtained. This resin was dried for 8 hours in a batch-type vacuum drier operated at 140° C. and a pressure of 10 Torr.

The dry flakes of resin thus obtained were extruded into chips through a vent-type extruder 40 mm in diameter at an extrusion temperature of 300° C. By analysis, the flakes were found to possess an intrinsic viscosity $[\eta]$ of 0.63 and a glass transition point (Tg) of 177° C. The bis-phenol A residue:sum of terephthalic acid residue and isophthalic acid residue (benzene dicarboxylic acid residue):carbonate moiety bond molar ratio was found to be 1:0.45:0.55 and the terephthalic acid residue:isophthalic acid residue molar ratio was found to be 5:5. The terminal carboxyl group content was found to be $0.8\mu$ equivalent/g of resin.

When the chips were injection molded through a 3.5-ounce injection molder at a resin temperature of 350° C., an injection pressure of 80-90 kg/cm$^2$ (by gauge) and a die temperature of 145° C. and the molded product was tested on a metal die specified by ASTM for the molding of test pieces used for determination of physical properties, there was obtained a molded article of high quality.

EXAMPLES 3-10

Several TPC-IPC mixtures of varying TPC/IPC ratios shown in the following table were treated by the procedure of Example 1 to yield white resin samples. The white resins so prepared were analyzed. The results of the analysis are shown in Table 1.

TABLE I

| Example No. | 3 | 4 | 5 | 6 | 7 | 8 | 9 | 10 |
|---|---|---|---|---|---|---|---|---|
| TPC/IPC (molar ratio) | 9.5/0.5 | 9/1 | 8/2 | 7/3 | 6/4 | 3/7 | 2/8 | 1/9 |
| Intrinsic Viscosity $[\eta]$ | 0.76 | 0.75 | 0.74 | 0.77 | 0.75 | 0.75 | 0.76 | 0.74 |
| Glass transition point (Tg) (°C.) | 184 | 183 | 181 | 180 | 178 | 175 | 174 | 174 |
| Bis-phenol A residue: terephthalic acid residue + isophthalic acid residue: carbonate moiety (molar ratio) | 1:0.57 :0.43 | 1:0.57 :0.43 | 1:0.55 :0.45 | 1:0.56 :0.44 | 1:0.58 0.42 | 1:0.55 :0.45 | 1:0.55 :0.45 | 1:0.56 :0.44 |
| Terminal carboxyl group content | 0.4 | 0.3 | 0.4 | 0.2 | 0.2 | 0.3 | 0.3 | 0.2 |

TABLE I-continued

| Example No. | 3 | 4 | 5 | 6 | 7 | 8 | 9 | 10 |
|---|---|---|---|---|---|---|---|---|
| (μ equivalent/g of resin) Injection pressure at 350° C. (kg/cm²-gauge) | 110–120 | 90–100 | 80–90 | 80–90 | 80–90 | 80–90 | 75–90 | 70–80 |

COMPARATIVE EXAMPLE 1

The procedure of Example 2 was faithfully repeated, with the exception that terephthaloyl chloride alone was used in place of the TPC/IPC mixture, to produce flakes of dry resin, which were subsequently converted into chips.

By analysis, the chips of resin were found to have an intrinsic viscosity [η] of 0.52 and a glass transition point (Tg) of 184° C. The bis-phenol A residue:terephthalic acid residue:carbonate moiety molar ratio was 1:0.46:0.54.

When the chips of resin were subjected to molding by the procedure of Example 2, the resin suffered from the phenomenon of short shot because of its poor flowability. For the resin to produce an article of good shape, the injection molding had to be conducted with the resin temperature elevated to 385° C. and an injection pressure of 100 kg/cm². In this instance, the shaped article sustained local burning because of the excessively high resin temperature.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. An aromatic polyester-polycarbonate resin having a glass transition point ranging from 160° C. to 190° C. and having a terminal carboxyl group content of not more than 10μ equivalents/g of resin, comprising:

a polymer material composed of repeating units of structures I–III:

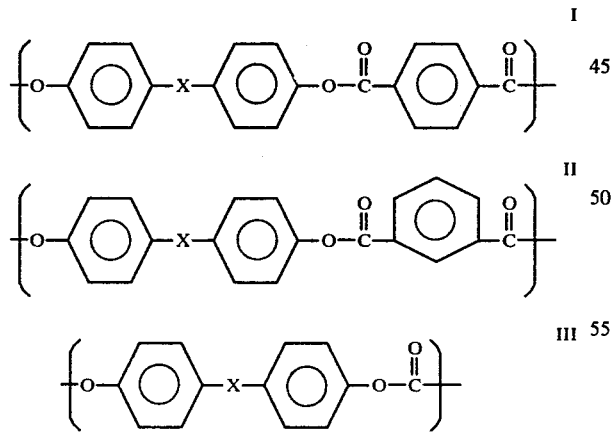

wherein X is a divalent organic radical and the divalent aromatic entities in structures in I, II and III may be substituted by hydrocarbon substituents and wherein the molar proportion of dihydroxy-diaryl units to benzene dicarboxylic acid units to carbonate units ranges from 1:0.33–0.75:0.67–0.25 with the molar ratio of the terephthalic acid units to isophthalic acid units of said benzene dicarboxylic acid units ranging from 9:1 to 2:8, said terephthalic acid units and said isophthalic acid units being formed in said polymer material by the presence of a terephthaloyl chloride compound selected from the group consisting of terephthaloyl chloride, methyl terephthaloyl chloride and 2,5-dimethyl terephthaloyl chloride and an isophthaloyl chloride compound selected from the goup consisting of isophthaloyl chloride and 2-methylisophthaloyl chloride in the reacting monomers which form said polymer material.

2. The resin of claim 1, wherein said resin has an intrinsic viscosity ranging from 0.4 to 1.5 at 20° C.

3. The resin of claim 1, wherein the dihydroxydiaryl monomer which forms said dihydroxy-diaryl units in said polymer material is selected from the group consisting of bis-(hydroxyaryl)-alkanes, bis-(hydroxyaryl)-cycloalkanes, dihydroxy-diarylethers, dihydroxy-diaryl sulfides, dihydroxydiaryl sulfoxides and dihydroxy-diaryl sulfones.

4. The resin of claim 1, wherein said molar ratio ranges from 8:2 to 3:7.

5. The resin of claim 1, wherein said molar proportion ranges from 1:0.33–0.49:0.67–0.51.

6. A method of preparting an aromatic polyester-polycarbonate resin, comprising:

polycondensing a dihydroxy-diaryl compound in an aqueous alkaline solution with a combination of a terephthaloyl chloride compound and an isophthaloyl chloride compound in an organic solvent thereby forming a low molecular weight polyester oligomer having terminal OH groups;

reacting said oligomer with phosgene thereby converting said terminal OH groups into terminal OCOCl groups;

condensing the product of reaction between said oligomer and said phosgene with a dihydroxy-diaryl compound in an aqueous alkaline solution; and separating the product polyester-polycarbonate resin from said reaction medium.

7. The method of claim 6, wherein said dihydroxydiaryl compound has the formula:

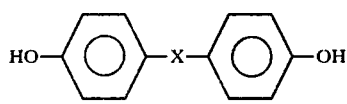

wherein X is a divalent radical selected from the group consisting of >CRR, >C=R', —O—, —S—, —SO— and —SO₂— and R is hydrogen or a monovalent hydrocarbon radical and R' is a divalent hydrocarbon radical.

8. The method of claim 7, wherein said terephthaloyl chloride compound is selected from the group consisting of terephthaloyl chloride, methyl terephthaloyl chloride and 2,5-dimethyl terephthaloyl chloride, and said isophthaloyl chloride compound is selected from the group consisting of isophthaloyl chloride and 2-methylisophthaloyl chloride.

* * * * *